United States Patent [19]

Teng

[11] Patent Number: 5,217,730
[45] Date of Patent: Jun. 8, 1993

[54] MULTI-CAVITY INJECTION MOLDING HEATED NOZZLE

[75] Inventor: Alex C. Teng, 2 Tillplain Road, Ontario, Canada, M3H 5R2

[73] Assignee: Alex C. Teng, Downsview, Canada

[21] Appl. No.: 877,770

[22] Filed: May 4, 1992

[51] Int. Cl.$^5$ ............................................. B29C 45/22
[52] U.S. Cl. ............................... 425/549; 264/328.15; 425/572
[58] Field of Search ................. 425/549, 572, 588; 264/328.15

[56] References Cited

U.S. PATENT DOCUMENTS

| | | | |
|---|---|---|---|
| 4,344,750 | 8/1982 | Gellert | 425/549 |
| 4,424,622 | 1/1984 | Krause | 425/566 |
| 4,837,925 | 6/1989 | Gellert | 425/549 |
| 4,921,708 | 5/1990 | Gellert | 425/549 |
| 5,028,227 | 7/1991 | Gellert et al. | 425/190 |

Primary Examiner—Tim Heitbrink
Attorney, Agent, or Firm—Dalesman & Company

[57] ABSTRACT

An injection molding nozzle having a melt channel with a number of diagonal portions which branch to equally spaced outlets for multi-cavity molding. The nozzle has an integral electrical heating element with a forward portion which extends adjacent the forward face of the nozzle between the spaced outlets of the melt channel. The forward portion of the heating element is integrally brazed in channels in the forward face of the nozzle and has a number of radially extending arms. One of the arms extends outward midway between each two adjacent outlets. This provides additional heat to the melt near the outlets and ensures it is evenly balanced between the diagonal portions of the melt channel.

6 Claims, 3 Drawing Sheets

MULTI-CAVITY INJECTION MOLDING HEATED NOZZLE

BACKGROUND OF THE INVENTION

This invention relates generally to injection molding and more particularly to a nozzle for multi-cavity molding having superior heating adjacent the melt channel outlets.

Multi-cavity injection molding is often provided by having a melt passage or channel branch in a heated manifold to several different nozzles. One example of this is shown in the applicants' U.S. Pat. No. 4,424,622 which issued Jan. 10, 1984. It is also known to provide for multi-cavity edge gating by having the melt passage or channel branch in the nozzle itself. This is shown in Gellert U.S. Pat. No. 4,344,750 which issued Aug. 17, 1982. While these nozzles have an integral electrical heating element, they have the disadvantage that adequate balanced heat is not provided around the different branches and outlets of the melt passage. This has become a more serious problem with the increasing demand to mold more temperature critical materials. An attempt to overcome this problem is shown in Gellert U.S. Pat. No. 4,921,708 which issued May 1, 1990. It shows the nozzle having a number of spaced conductive probes, one aligned with each gate. After the melt flows centrally through the nozzle, it branches outward around each of the conductive probes and through the respective gate. However, this nozzle does not provide sufficient heat for all applications. Also, the large areas of liquid melt apply so much back pressure against the manifold that leakage can result at high pressure.

SUMMARY OF THE INVENTION

Accordingly it is an object of the present invention to at least partially overcome the disadvantages of the prior art by providing a nozzle for multi-gate molding having an integral heating element which provides more balanced heat adjacent each of the various melt channel outlets.

To this end, in one of its aspects, the invention provides an injection molding nozzle to be seated in a well in a cavity plate, the nozzle having a rear end, a forward face, and a melt channel extending therethrough to convey melt from an inlet at the rear end towards a plurality of spaced gates extending through the cavity plate, the melt channel having a central portion and a plurality of diagonal portions, the central portion extending longitudinally from the rear end, and each of the diagonal portions branching diagonally outwards to an outlet, the outlets being equally spaced with each outlet leading to a respective one of said gates, the nozzle having an integral electrically insulated heating element, the heating element having a terminal adjacent the rear end of the nozzle and a spiral portion extending in the nozzle around at least part of the central portion of the melt channel, the improvement wherein the heating element has a forward portion extending adjacent the forward face of the nozzle transversely between the equally spaced outlets of the diagonal portions of the melt channel, the forward portion of the heating element extending in a predetermined configuration with a plurality of arms, one of said arms extending radially outward in a direction midway between each adjacent two of said outlets.

Further objects and advantages of the invention will appear from the following description taken together with the accompanying drawings.

DETAILED DESCRIPTION OF THE DRAWINGS

Figure 1:
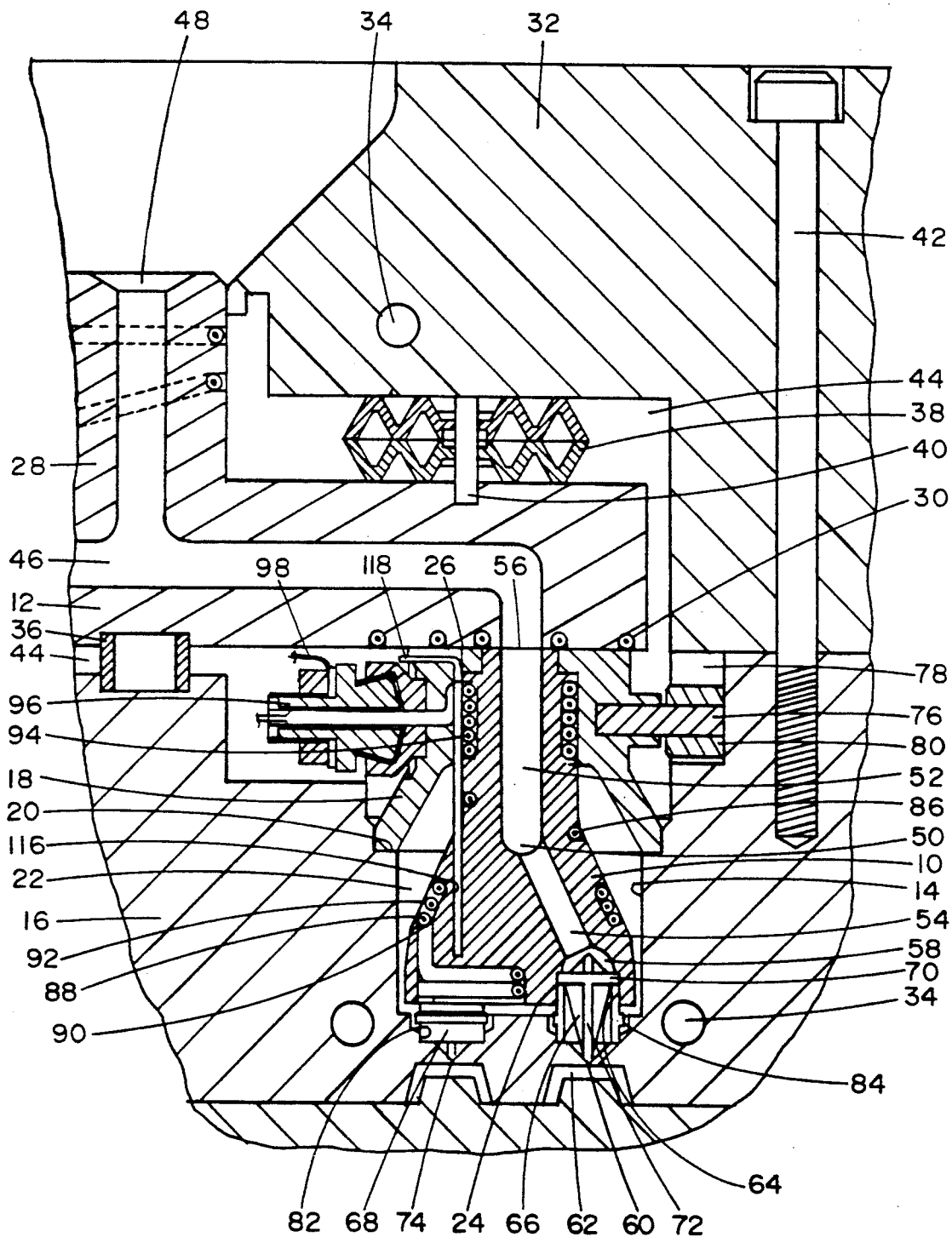
FIG. 1 is a sectional view of a portion of a multi-cavity injection molding system showing a nozzle according to one embodiment of the invention.
Figure 2:
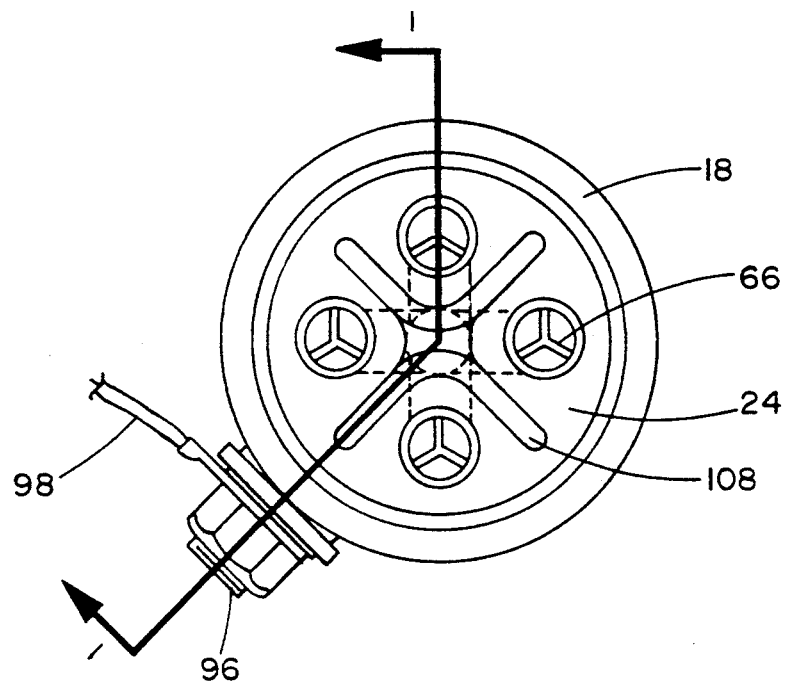
FIG. 2 is a view of the forward face of the nozzle with the torpedoes mounted in place.

Reference is first made to FIG. 1 which shows a portion of a multi-cavity injection molding system having integral heated nozzles 10 according to one embodiment of the invention. While the system shown has a steel manifold 12 to distribute melt to several nozzles 10, other systems may only have a single nozzle which itself distributes the melt to several different gates as described in more detail below. Each nozzle 10 extends into a well 14 in a steel cavity plate 16. While only a single cavity plate 16 is shown for ease of illustration, there may, of course, be various spacer, retainer or other types of plates or inserts depending upon the mold configuration. In this embodiment, each nozzle 10 has a circumferential insulation flange 18 which seats against a matching shoulder 20 in the well 14, and the well 14 is shaped to provide a desired insulative air space 22 between it and the heated nozzle 10. Each nozzle 10 has a forward face 24 and a rear end 26 against which the melt distribution manifold 12 abuts. The manifold 12 has a cylindrical inlet portion 28 and an electrical heating element 30. The manifold 12 is mounted to extend between the cavity plate 16 and a steel back plate 32. The cavity plate 16 and the back plate 32 are cooled by pumping cooling water through cooling conduits 34. A ring 36 is seated between the manifold 12 and the cavity plate 16 to accurately locate the manifold 12 in place. Double insulative and resilient spacer members 38 are located between the manifold 12 and the back plate 32 by pins 40. The back plate 32 is secured in position by retaining bolts 42 which extend into the cavity plate 16. The back plate 32 applies a force through the spacer members 38 and the heated manifold 12 which holds the nozzles 10 securely in position. Thus, the heated melt distribution manifold 10 is securely located in a position which provides an insulative air space 44 between it and the adjacent cooled cavity plate 16 and back plate 12. As is well known, this provides considerable thermal separation by minimizing actual steel to steel contact between the heated and cooled components of the mold.

A melt passage 46 extends from a common inlet 48 in the inlet portion 28 of the manifold 12 and branches outwardly to each nozzle 10 where it extends through a melt channel 50. The melt channel 50 of each nozzle 10 has a central portion 52 and several diagonal portions 54. The central portion 52 extends longitudinally from an inlet 56 at the rear end 26, and the diagonal portions 54 branch diagonally outward from the central portion 52 to spaced outlets 58. In this embodiment the outlets 58 are equally spaced around the forward face 24 of the nozzle 10 and each leads to a gate 60 which extends through the cavity plate 16 to one of the cavities 62. Each diagonal portion 54 of the melt channel 50 through the nozzle 10 has an enlarged seat 64 to securely receive a torpedo 66 and a hollow cylindrical seal 68. As seen in the applicants' U.S. Pat. No. 5,028,227 which issued Jul. 2, 1991, each torpedo 66 has an outer ring 70 and several spaced fins 72 which taper to a pointed tip 74 which is aligned with one of the gates 60. Each nozzle 10 has a locating pin 76 which extends into an opening 78 in the cavity plate 16 where it is secured by a cam 80 to ensure the alignment of the pointed tips 74 of the torpedoes 66 with the respective gates 60 is accurately maintained. Each seal 68 slip fits into one of the seats 64 to hold one of the torpedoes 66 in place and abuts against a circular seat 82 extending around one of the gates 60 in the cavity plate 16 to prevent leakage of pressurized melt into the insulative air space 22. Each seal 68 has a circular removal flange 84 which provides additional hoop strength and facilitates it being pried out of the seat 64 with an appropriate tool for replacement of the torpedo 66.

Figure 3:
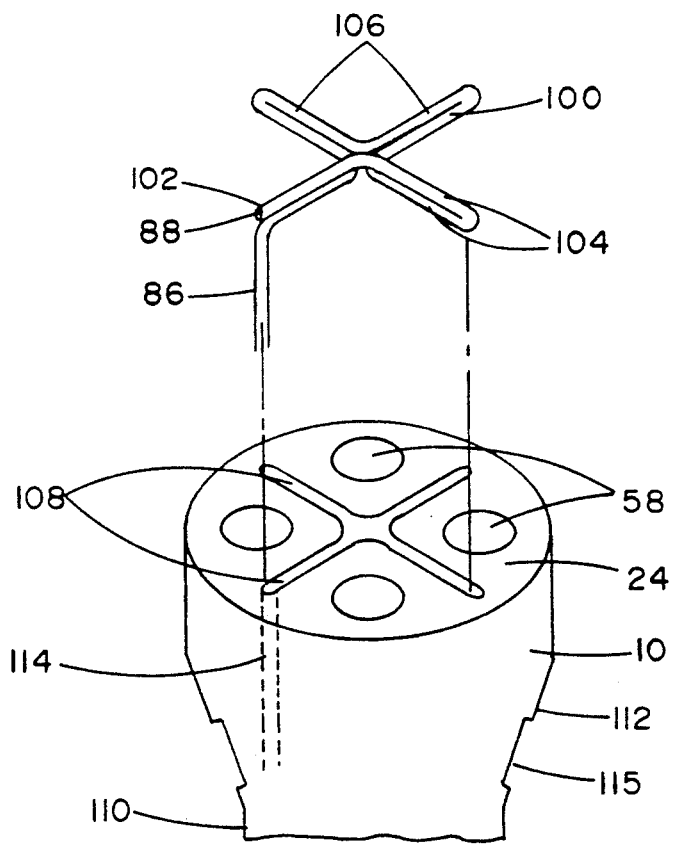
FIG. 3 is a partial exploded isometric view illustrating how the nozzle is made.

Each nozzle 10 is heated by an integral electrically insulated heating element 86, and reference is now also made to FIG. 3 in describing how it is made. The heating element 86 has a nickel-chrome resistance wire 88 extending through a refractory powder 90 such as magnesium oxide in a steel casing 92. It is integrally brazed in the nozzle 10 and has a spiral portion 94 which extends around the central portion 52 of the melt channel 50 to an external electrical terminal 96. The terminal 96 is made of a number of components as described in Gellert U.S. Pat. No. 4,837,925 which issued Jun. 13, 1989 to provide a threaded connection for a lead 98 from an external power source (not shown). The heating element 86 also has a forward portion 100 which extends in a predetermined configuration transversely adjacent the forward face 24 of the nozzle 10. In this embodiment, the melt channel 50 has four outlets 58 which are equally spaced around the forward face 24 of the nozzle 10. A length of heating element 86 is cut to have a diagonal forward end 102 to expose the internal resistance wire 88. It is then prebent adjacent its forward end 102 into the predetermined configuration to form the forward portion 100. As seen in FIG. 3, in this embodiment, the forward portion 100 is made with two layers 104 and four radially extending arms 106. The forward portion 100 is then inserted into matching grooves 108 machined in the forward face 24 of the nozzle 10. Thus, the forward portion 100 of the heating element 86 extends between the four outlets 58 of the melt channel 50 with each arm 106 extending midway between each adjacent two of the outlets 58. This provides more heat adjacent the melt channel outlets 58 and the heat provided is evenly balanced between the outlets 58. The nozzle 10 has an outer surface 110 with a tapered portion 112. The heating element 86 is inserted to extend from the forward portion 100 through a longitudinal bore 114 in the nozzle 10 and is then wound in a spiral groove 115 which extends around the outer surface 110 of the nozzle to form the spiral portion 94 of the heating element 86. A hollow filler tube (not shown) is mounted where the grooves 108 cross on the forward face 24 of the nozzle 10 to receive a nickel alloy. The nozzles 10 are then loaded in batches into a vacuum furnace. As the furnace is gradually heated to the melting temperature of the nickel alloy, it is evacuated to a relatively high vacuum to remove substantially all of the oxygen. Well before the melting point of the nickel alloy is reached, the vacuum is reduced by partially backfilling with an inert gas such as argon or nitrogen. When the nickel alloy melts, it flows by capillary action down to integrally braze the heating element 86 in the grooves 108, 112, and the other parts of the nozzle 10 are also integrally brazed together. This brazing in the vacuum furnace provides a metallurgical bonding of the nickel alloy to the steel which improves the efficiency of the heat transfer from the heating element 86. Of course, the nickel alloy contacts and fuses the resistance wire 88 at the diagonal forward end 102 which electrically grounds the heating element 86. Each nozzle 10 is also provided with a longitudinally extending thermocouple bore 116 to removably receive a thermocouple wire 118 to monitor the operating temperature adjacent the outlets 58 of the melt channel 50.

In use, the injection molding system is assembled as shown in FIG. 1. Electrical power is applied to the heating element 30 in the manifold 12 and to the heating elements 86 in the nozzles 10 to heat them to a predetermined operating temperature. Pressurized melt from a molding machine (not shown) is then injected into the melt passage 46 through the common inlet 48 according to a predetermined cycle in a conventional manner. In this embodiment, the pressurized melt branches first in the manifold 12 and then in each nozzle 10 to the gates 60 to fill the cavities 62. After the cavities 62 are filled, injection pressure is held momentarily to pack and then released. After a short cooling period, the mold is opened to eject the molded products. After ejection, the mold is closed and injection pressure is reapplied to refill the cavities 62. This cycle is continuously repeated with a frequency dependent on the size and shape of the cavities and the type of material being molded. The branching of the diagonal portions 54 of the melt channel 50 in each nozzle 10 and the location of the forward portion 100 of the heating element 86 between the outlets 58 provides additional heat to the melt near the outlets 58 and ensures that it is evenly balanced between the various diagonal portions 54.

Figure 4:
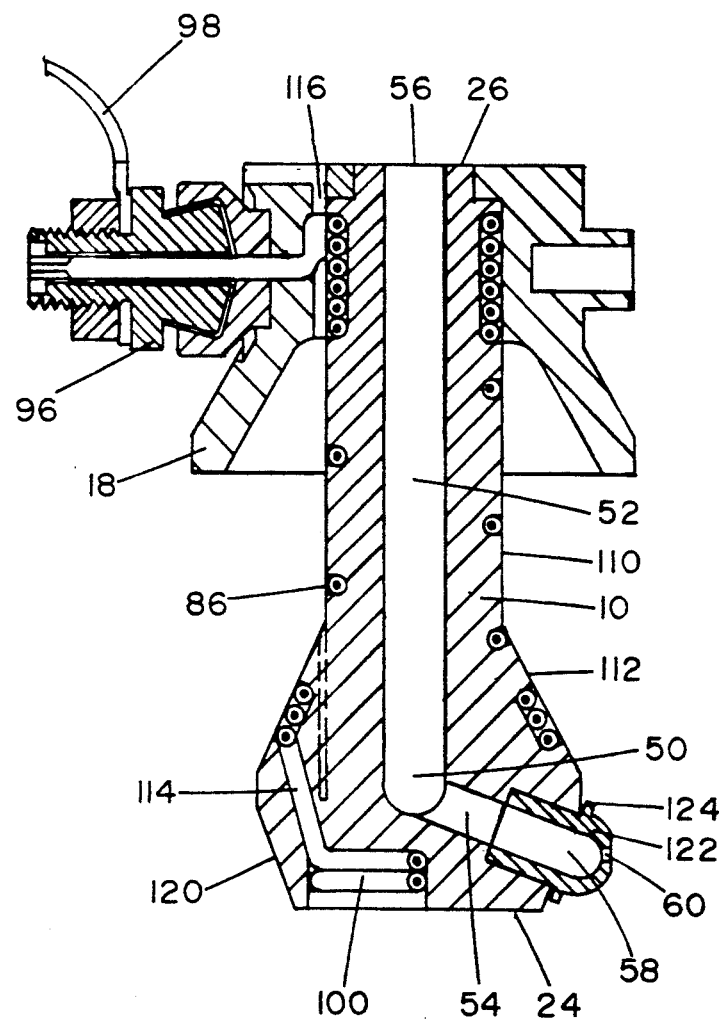
FIG. 4 is a sectional view of a nozzle according to another embodiment of the invention.

Reference is now made to FIG. 4 to describe a second embodiment of the invention. As most of the elements of this embodiment are the same as those of the first embodiment described above, elements common to both embodiments are described and illustrated using the same reference numerals. In this embodiment, the nozzle 10 has a slightly different shape with a beveled surface 120 extending around adjacent the forward face 24. The diagonal portions 54 of the melt channel 50 branch outwardly from the central portion 52 to the outlets 58 which are equally spaced around the beveled surface 120. In this embodiment, the seals are provided by gate inserts 122 which are seated in the seats 64 around each of the outlets 58. As shown, each gate insert 122 has a gate 60 which extends on an angle to provide for multi-cavity edge gating. The bore 110 extends on a slight angle and the forward portion 100 of the heating element 86 has somewhat different dimensions than in the first embodiment. The seat 64 and the gate insert 122 are threaded and the gate insert 122 has a hexagonal portion 124 for tightening it into place. Otherwise the description and operation of this embodiment is the same as that given above and need not be repeated.

While the description of the nozzles 10 has been given with respect to preferred embodiments, it will be evident that various modifications are possible without departing from the scope of the invention as understood by those skilled in the art and as defined in the following claims.

The embodiments of this invention in which an exclusive property or privilege is claimed are defined as follows:

1. In an injection molding nozzle to be seated in a well in a cavity plate, the nozzle having a rear end, a forward face, and a melt channel extending therethrough to convey melt from an inlet at the rear end towards a plurality of spaced gates extending through the cavity plate, the melt channel having a central portion and a plurality of diagonal portions, the central portion extending longitudinally from the rear end, and each of the diagonal portions branching diagonally outwards to an outlet, the outlets being equally spaced with each outlet leading to a respective one of said gates, the nozzle having an integral electrically insulated heating element, the heating element having a terminal adjacent the rear end of the nozzle and a spiral portion extending in the nozzle around at least part of the central portion of the melt channel, the improvement wherein;

the heating element has a forward portion extending transversely adjacent the forward face of the nozzle between the equally spaced outlets of the diagonal portions of the melt channel, the forward portion of the heating element extending in a predetermined configuration with a plurality of arms, one of said arms extending radially outward in a direction midway between each adjacent two of said outlets.

2. An injection molding nozzle as claimed in claim 1 wherein the outlets of the diagonal portions of the melt channel are equally spaced around the forward face of the nozzle.

3. An injection molding nozzle as claimed in claim 1 wherein the nozzle has at least one beveled surface adjacent the forward face and the outlets of the diagonal portions of the melt channel are equally spaced around the beveled surface.

4. An injection molding nozzle as claimed in claim 1 wherein the forward portion of the heating element is integrally brazed in grooves in the forward face of the nozzle.

5. An injection molding nozzle as claimed in claim 4 wherein the forward portion of the heating element comprises two layers received in the grooves in the forward face of the nozzle.

6. An injection molding nozzle as claimed in claim 1 wherein each diagonal portion of the melt channel has an enlarged seat adjacent the outlet to receive a matching hollow seal to extend into sealing contact with the adjacent cavity plate.

* * * * *